(12) United States Patent
Boskovitch et al.

(10) Patent No.: US 8,855,845 B2
(45) Date of Patent: Oct. 7, 2014

(54) SYSTEMS AND METHODS FOR CONTROLLING OPERATION OF A VEHICLE

(71) Applicant: Fisker Automotive and Technology Group LLC, Costa Mesa, CA (US)

(72) Inventors: Paul Boskovitch, Anaheim, CA (US); Kevin Walsh, Anaheim, CA (US)

(73) Assignee: Fisker Automotive and Technology Group LLC, Costa Mesa, CA (US)

(*) Notice: Subject to any disclaimer, the term of this patent is extended or adjusted under 35 U.S.C. 154(b) by 0 days.

(21) Appl. No.: 13/656,530

(22) Filed: Oct. 19, 2012

(65) Prior Publication Data

US 2013/0184915 A1    Jul. 18, 2013

Related U.S. Application Data

(60) Provisional application No. 61/550,015, filed on Oct. 21, 2011.

(51) Int. Cl.
| | |
|---|---|
| *B60W 20/00* | (2006.01) |
| *B60K 6/46* | (2007.10) |
| *B60W 50/08* | (2012.01) |
| *B60W 10/08* | (2006.01) |
| *B60W 10/06* | (2006.01) |
| *B60W 10/26* | (2006.01) |

(52) U.S. Cl.
CPC ......... *B60W 20/20* (2013.01); *B60W 2510/244* (2013.01); *B60K 6/46* (2013.01); *B60W 20/106* (2013.01); *B60W 50/082* (2013.01); *Y02T 10/6217* (2013.01); *B60W 10/08* (2013.01); *B60W 10/06* (2013.01); *Y10S 903/903* (2013.01); *B60W 10/26* (2013.01); *B60W 20/00* (2013.01); *Y02T 10/6286* (2013.01)

USPC .......... 701/22; 180/65.31; 180/65.8; 903/903

(58) Field of Classification Search
None
See application file for complete search history.

(56) References Cited

U.S. PATENT DOCUMENTS

| | | | |
|---|---|---|---|
| 2010/0138089 A1* | 6/2010 | James | 701/22 |
| 2010/0211242 A1* | 8/2010 | Kelty et al. | 701/22 |
| 2011/0155489 A1* | 6/2011 | Wenger et al. | 180/65.22 |
| 2011/0298219 A1* | 12/2011 | Wenger et al. | 290/1 A |
| 2012/0158227 A1* | 6/2012 | Tate et al. | 701/22 |
| 2012/0255799 A1* | 10/2012 | Kohler et al. | 180/65.245 |

FOREIGN PATENT DOCUMENTS

| | | | |
|---|---|---|---|
| DE | 10302504 A1 * | 9/2004 | |
| JP | 2001-231103 * | 8/2001 | |

* cited by examiner

Primary Examiner — Michael J Zanelli

(57) ABSTRACT

A method of controlling operational modes of a hybrid electric vehicle includes: determining whether an all-electric range (AER) of the vehicle is at or less than a first predetermined value; activating a first operational mode if the AER is determined to be at or less than the first predetermined value; determining, while the first operational mode is active, whether the AER of the vehicle is greater than a second predetermined value; activating a second operational mode if the AER is determined to be greater than the second predetermined value.

17 Claims, 2 Drawing Sheets

SYSTEMS AND METHODS FOR CONTROLLING OPERATION OF A VEHICLE

CROSS-REFERENCE TO RELATED PATENT APPLICATIONS

This application claims priority to U.S. Provisional Application No. 61/550,015, filed Oct. 21, 2011, incorporated herein by reference in its entirety.

BACKGROUND

1. Field

The present disclosure relates generally to a vehicle, and more particularly to an electric hybrid vehicle.

2. Related Art

Electric vehicles (EVs) are vehicles that utilize one or more electric motors for propulsion. Plug-in hybrid electric vehicles (PHEVs) utilize one or more electric motors and one or more rechargeable energy storage system (RESS, e.g. a battery) that powers these motors in combination with a conventional (e.g., combustion powered) powertrain. The RESS of EVs and PHEVs may recharge from a number of sources including fossil fuels, nuclear power, or renewable sources such as solar power, wind power, and the like.

Some governments provide incentives for purchase of EVs. In Denmark, for example, EVs are exempt from an initial tax, which amounts to 180% of the purchase price for gasoline vehicles. Denmark and Norway, among other governments, currently employ tax incentives to reduce fossil fuel consumption for transportation. These incentives aim to encourage the adoption of clean technologies such as electric vehicles. Electric vehicles do not emit greenhouse gasses ($CO_2$), Nitrous Oxides ($NO_x$), particulates, or carbon monoxide (CO) and can refuel from proven renewable energy technologies such as wind, solar, geothermal, and hydro (dams and tidal energy).

To qualify as an electric vehicle under these incentives, vehicles must meet certain criteria. Moreover, regulators in Denmark and Norway are evaluating additional criteria to allow plug-in hybrid electric vehicles (PHEVs) to apply for the tax incentives.

For example, regulators may require that a range-extending engine of a vehicle not activate until a user (e.g., driver) makes a deliberate manual selection, and after the onset of a low-range indicator. Furthermore, the low-range indicator may only illuminate once the battery of the vehicle has a charge that provides less than a predetermined electric range e.g., 15 km). The low-range indicator will deactivate once the user plugs the vehicle in and charges the vehicle past the low-range limit (e.g., 15 km). In addition, the vehicle must complete at least three new European driving cycles (NEDCs) under electric power only (i.e., without assistance from the range-extending engine and without recharging) in standard conditions. The distance the vehicle can achieve in this manner defines its all-electric range (AER).

A PHEV, however, cannot take advantage of the aforementioned incentives, even if it has the capability to run fully electric. This is because while some PHEVs can function as pure electric vehicles, the engine may still operate at times for various reasons such as, high-power demand, anticipated high power demand, preservation of the battery or other components, evaporative emissions purge, maintenance, extreme temperatures, or the like.

In a high power demand scenario, the user can select a vehicle mode in which the engine will run to aid in vehicle performance. For example, some vehicles enable the user to switch the operating mode of the vehicle from a standard mode to a "sport" mode to enhance performance. In an anticipated high power demand scenario, a vehicle may use its navigation to anticipate power and energy demands, such as, an impending hill, or the like. The vehicle may then turn on the engine to charge the battery in advance in order to avoid decreased performance at low battery levels, or to avoid inefficient regimes of operation. In a preserve battery or other component scenario, the engine will turn on to power a PHEV before the battery energy depletes because rechargeable batteries degrade quickly when the vehicle discharges them deeply. Any vehicle with a fuel system produces evaporative emissions, even when the engine does not run. Gasoline evaporates, and daily temperature fluctuations cause pressure fluctuations in the fuel system. The fuel system vents vapors when relieving this pressure, but can capture them in a carbon canister. A vehicle may run the engine to burn these vapors. A vehicle may also run its engine for maintenance reasons. A vehicle may run the engine when the electric powertrain is outside its preferred operating temperatures. The engine may run to provide heat to the passengers and to warm up the electric drive system. While running the engine under the aforementioned scenarios can be useful, running the engine when it is not necessary may be objectionable to regulators and customers.

SUMMARY

A system for controlling operational modes of a hybrid electric vehicle includes, hut is not limited to any one or combination of: a rechargeable energy storage system coupled to an electrical motor for powering the vehicle; a range-extending engine coupled to a generator for powering the vehicle; and a controller operable by a user to select an operational mode of the vehicle from among a plurality of operational modes including at least a first mode and a second mode. The first mode is selectable only if an all-electric range or the vehicle is less than a predetermined value. The range-extending engine is enabled in response to selection or the first mode by the controller.

A method of controlling operational modes of a hybrid electric vehicle includes, but is not limited to any one or combination of: determining whether an all-electric range (AER) of the vehicle is at or less than a first predetermined value; activating a first operational mode if the AER is determined to be at or less than the first predetermined value; determining, while the first operational mode is active, whether the AER of the vehicle is greater than a second predetermined value; and activating a second operational mode if the AER is determined to be greater than the second predetermined value.

A method of controlling operational modes of a hybrid electric vehicle includes, but is not limited to any one or combination of: receiving a request to activate a first operational mode of the vehicle via an actuator; determining, in response to receiving the request, whether an all-electric range (AER) of the vehicle is less than a first predetermined value; activating the first operational mode if the AER is less than the first predetermined value and preventing activation of the first operational mode if the AER is not less than the first predetermined value; determining, while in the first operational mode, if an energy storage device of the vehicle has been recharged such that the AER is above a second predetermined value; maintaining the vehicle in the first operational mode if the energy storage device has not been recharged such that the AER is above the second predetermined value; and activating a second operational mode if the energy storage device has been recharged such that the AER is above the second predetermined value.

In various embodiments, the hybrid vehicle meets criteria to benefit from electric vehicle regulatory incentives. In various embodiments, the hybrid vehicle performance is optimized. In various embodiments, the hybrid vehicle provides reduced pollutant emissions. In various embodiments, the hybrid vehicle provides reduced audible noise. In various embodiments, the hybrid vehicle provides reduced manufacturing cost and time relative to a hardware electric vehicle variant (no engine) because of less engineering, no tooling, and no safety recertification associated with weight changes. In various embodiments, the hybrid vehicle provides increased utility because a driver can use fuel to extend the range the vehicle can drive, and rely on existing gasoline infrastructure. In various embodiments, the hybrid vehicle provides increased safety because the driver is less likely to be stranded in a dangerous situation and the engine can provide heat.

DETAILED DESCRIPTION

Figure 1:
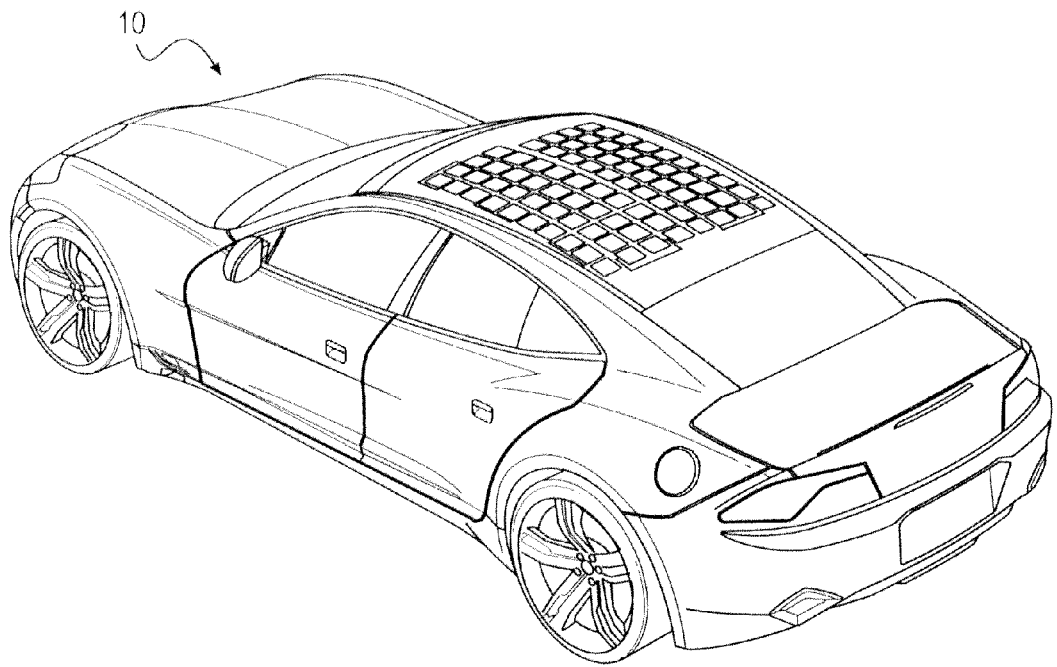
FIG. 1 is a perspective view of a vehicle according to various embodiments of the disclosure.

Referring to FIG. 1, a vehicle 10 is illustrated. The vehicle 10 may be a passenger car, truck, or the like. In this example, the vehicle 10 is a PHEV that includes an engine (not shown) that is gasoline powered, which drives a generator that generates electricity. The engine may also operate on another fuel, such as diesel, methane, propane, hydrogen, or the like.

According to various embodiments, the vehicle 10 is configured to allow for electric vehicle (EV) operation while meeting various operating characteristics and criteria to qualify for electric vehicle regulatory incentives. The engine (also referred to a range-extending engine), which is configured to extend the range of the vehicle 10, may only turn on after a user (also referred to as a driver) activates or otherwise enables a particular mode of operation. For instance, with reference to FIGS. 1 and 2, the engine may turn on after the driver manually activates a hybrid mode (or a first mode) via a paddle 14 (or other actuator for selecting a mode) on a steering wheel 15 of the vehicle 10. A notification or other indicator will appear on an indicator 12 to inform the driver when this option exists to allow selection of the hybrid mode. In particular embodiments, a control system of the vehicle 10 only allows the driver to activate the hybrid mode after the vehicle 10 has depleted its all-electric range (AER). In other embodiments, the vehicle control system allows the driver to select the hybrid mode when the AER of the vehicle 10 is less than a predetermined amount or value (e.g., 15 km). In particular embodiments, the predetermined amount may be based on standards, regulations, incentives, and/or the like by governments or other entities. In various embodiments, in the hybrid mode, the vehicle 10 will continue operating under electric power, while only using the range extending engine as needed. Accordingly, the vehicle 10 will meet cycle requirements for its AER. For example, some proposals circulating through the EU state that electric vehicles must complete at least three New European Drive Cycles (NEDC) under electric power only.

The vehicle 10 and its operational modes are described in the disclosure. Additional discussion and/or examples of operating modes are disclosed in, but are not limited to, U.S. patent application Ser. No. 13/197,608, which is herein incorporated by reference in its entirety. These operating modes, for example, provide the driver with different performance characteristics for the vehicle 10.

During normal operation of a standard stealth mode, the battery of the vehicle 10 depletes to approximately 20% state of charge (SOC), at which point the engine will automatically and periodically turn on. In this mode, the vehicle 10 will operate as a standard charge-sustaining hybrid. For instance, the engine activates based on algorithms that optimize efficiency and performance, considering environmental conditions, battery SOC, battery parameters, driver demand, and/or the like.

Normal operation of a standard sport mode enables the engine to activate on demand for maximum performance. In particular embodiments, this mode would also limit the AER below approximately 40 km (i.e., less than three NEDC cycles). This occurs because with the sport mode active, the vehicle 10 maintains a high battery SOC in order to provide for elevated vehicle performance. Specifically, the sport mode has a target SOC of about 50%. That is, the vehicle 10 will activate the engine for charge-sustaining operation whenever the battery SOC falls below approximately 50% SOC.

In various embodiments, the standard stealth and sport modes have been eliminated and replaced with a modified stealth mode (or second mode) for electric-only operation. The modified stealth node disallows automatic engine operation until alter the indicator 12 illuminates (or provides other indication such as an audible, tactile, and/or other indication) and the driver manually selects the hybrid mode. In particular embodiments, the indicator 12 only illuminates once the AER of the vehicle 10 has fallen below a predetermined value, such as 15 km. In particular embodiments, the modified stealth mode will operate in the same manner as the standard stealth mode with some exceptions, as will be discussed.

In some embodiments, for example, during operation in the modified stealth mode, once the AER of the vehicle 10 has fallen below the predetermined value (e.g., 15 km) (and, in some embodiments, the indicator 12 illuminates), the driver can activate the hybrid mode with the paddle 14. Once in the hybrid mode, the vehicle 10 will continue under electric power until engine power is needed. When the vehicle 10 requires engine power, the engine will start automatically and the vehicle 10 will operate as it would in the normal, charge-sustaining standard stealth mode. In this mode of operation, the vehicle 10 will operate as any charge-sustaining hybrid electric vehicle (HEV), utilizing coast down engine-off, engine-off at stop, electric launch, electric start, highway lean fueling optimization, and/or the like.

The driver may elect to activate the hybrid mode at any time after the indicator 12 provides the indication that the AER of the vehicle 10 is below the predetermined value. Once the indication is provided, the indicator 12 may remain on and, optionally, may flash or repeat at a quicker pace until the driver activates the hybrid mode. If the driver does not activate the hybrid mode and the AER is below a different predetermined value (e.g., 5 km) that is less than the first predetermined value, a performance limit indicator 16 will provide an indication. In addition or in the alternative, the vehicle 10 may limit performance based on available energy. Thus, according to various embodiments, the driver should enable the hybrid mode between 15 km and 5 km electric range to avoid reduced performance or loss of vehicle propulsion. In some embodiments, upon the AER of the vehicle 10 reaching the first predetermined value, the different predetermined value, or other predetermined value, the control system of the vehicle 10 may automatically change to the hybrid mode (without activating by the user). In some embodiments, the same indicator may be used for the indicator 12 and the performance limit indicator 16. In other embodiments, the indicator 12 and the performance limit indicator 16 may be different indicators.

Once enabled, the hybrid mode will remain active until the battery of the vehicle 10 has been recharged (e.g., via a plug-in charger or by regenerative braking down a hill), such that the electric range is above the predetermined value. Once the electric range is above the predetermined value, the mode may automatically change to the modified stealth mode. The indicator 12 may also turn off at this time. If applicable, the low performance indicator 16 will turn off as well. In other embodiments, the mode is changed to the modified stealth mode manually by the user (e.g., via the paddle 14). In some embodiments, the vehicle 10 is configured to record and or display engine-on hours, electric-only distance, hybrid distance travelled, and/or the like.

In various embodiments, normally the engine will not turn on automatically. In such embodiments, an exception is to purge evaporative emissions in order to meet regulatory requirements. Examples of evaporative emission control systems are disclosed in (but are not limited to) U.S. patent application Ser. No. 13/244,160, which is herein incorporated by reference in its entirety.

For instance, for extreme cold conditions, drivers should keep the vehicle 10 plugged in whenever possible to prevent electrolyte freezing in the battery. This will allow for temperature stabilization and maintenance of the battery after charging. In some embodiments, if the vehicle 10 is left for an extended period of extreme cold, propulsion using the battery alone may prove impossible or severely limited due to electrolyte freezing. The engine will still not turn on automatically, but in these conditions the indicator 12 will appropriately illuminate as the electric AER is essentially zero. In this case, the driver can engage the hybrid mode. Once the driver engages the hybrid mode, the engine will start to enable vehicle propulsion and heat (e.g., to warm the battery). After the battery warms up and the vehicle 10 can once again provide adequate electric-only operation, the engine may automatically turn off and the vehicle 10 will revert to the modified stealth mode, if the electric range is above the predetermined value. This cold weather capability is a positive feature of PHEVs. EVs without an engine may not be able to provide adequate performance for vehicle propulsion or heat when operating in extreme cold conditions. Owners may have elect to own a separate gasoline vehicle for cold weather situations (as well as long trips), which counters the goals of clean technology incentives.

In various embodiments, the modes of operation described will be enabled by modifying the vehicle's 10 operating system software for the designated country. In such embodiments, the overall driving experience is not affected with the exception that the standard sport mode has been eliminated, so the vehicle will be limited to the stealth mode performance levels.

The driver must be able to activate the hybrid mode safely while driving. Accordingly, in some embodiments, mode selection hardware (e.g., the paddle 14) is provided on the interior of the vehicle 10, well within reach of the driver, for example, on or near the steering wheel 15.

In various embodiments, selection of the hybrid mode does not turn the range-extending engine on; rather, selection of the hybrid mode enables the control system of the vehicle 10 to turn the range-extending engine on when needed. In this mode, the engine use is optimized for efficient operation.

Figure 2:
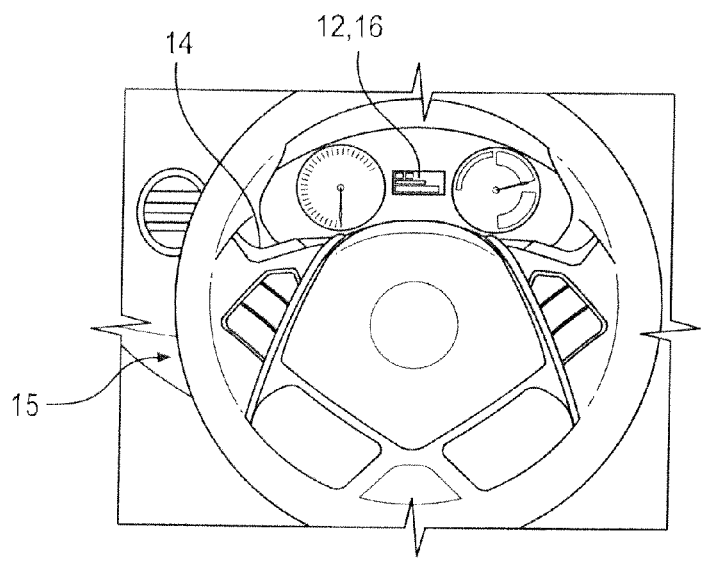
FIG. 2 is a partial front view of a steering wheel and dashboard of a vehicle according to various embodiments of the disclosure.
Figure 3:
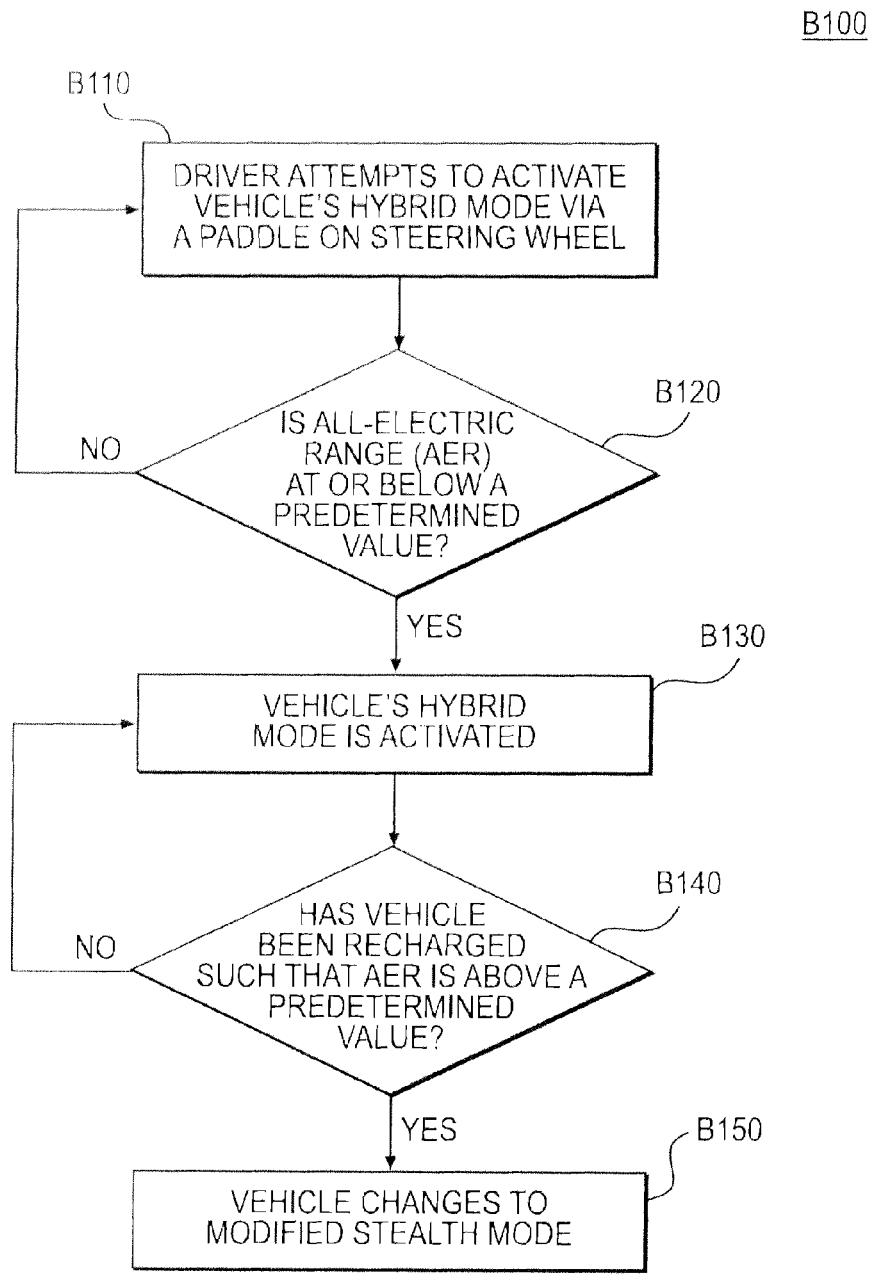
FIG. 3 is a flow chart depicting a method for controlling operational modes of a vehicle according to various embodiments of the disclosure.

In FIG. 3, a method B100 of controlling the operational modes of the vehicle 10 is shown. With reference to FIGS. 1-3, the method B100 begins at block B110 when the driver of the vehicle 10 activates the hybrid mode, for example, via the paddle 14 on the steering wheel 15. This may occur, for instance, while the vehicle is in the modified stealth mode, for example. In particular embodiments, the driver is only allowed to activate the hybrid mode in response to a predetermined event. For example, the predetermined event may be the AER of the vehicle 10 being less than a first predetermined value (e.g., 15 km). The occurrence of such an event may be communicated by an indicator (e.g., the indicator 12).

At block B120, the control system (e.g., a processor running hybrid control software of the vehicle 10) determines whether the AER of the vehicle 10 has fallen below a first predetermined value. If the AER is not below the predetermined value (B120: No), the method B100 returns to block B110 such that the control system does not activate or otherwise prevents activation of the hybrid mode. If the AER is below the first predetermined value (B120: Yes), the method B100 proceeds to block B130 wherein the control system activates the hybrid mode.

At block B140, the control system determines if the vehicle 10 (e.g., battery) has been recharged such that the AER is above a second predetermined value, such as 15 km electric range, or the like. If the vehicle 10 has not been recharged such that the AER is above the second predetermined value (B140: No), the method B100 returns to block B130 and the vehicle 10 remains in the hybrid mode. If the vehicle 10 has been recharged such that the AER is above the second predetermined value (B140: Yes), the method B100 proceeds to block B150 and the vehicle 10 may automatically revert to the modified stealth mode. In some embodiments, the second predetermined value is the same as the first predetermined value. In other embodiments, the second predetermined value is different from the first predetermined value.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope or the disclosure. Thus, the present disclosure is not intended to be limited to the embodiments shown herein but is to be accorded the widest scope consistent with the principles and novel features disclosed herein.

What is claimed is:

1. A system for controlling operational modes of a hybrid electric vehicle, the system comprising:
   a rechargeable energy storage system coupled to an electrical motor for powering the vehicle;
   a range-extending engine coupled to a generator for providing power for driving the electric motor; and
   a controller operable by a user to select an operational mode of the vehicle from among a plurality of operational modes including at least a first mode and a second mode;
   wherein the first mode is selectable only if an all-electric range of the vehicle is less than a predetermined value;

wherein the range-extending engine is enabled in response to selection of the first mode by the controller.

2. A method of controlling operational modes of a hybrid electric vehicle, the method comprising:
- determining whether an all-electric range (AER) of the vehicle is at or less than a first predetermined value;
- activating a first operational mode if the AER is determined to be at or less than the first predetermined value;
- determining, while the first operational mode is active, whether the AER of the vehicle is greater than a second predetermined value; and
- activating a second operational mode if the AER is determined to be greater than the second predetermined value; and
- providing a first indication to a user of the vehicle that the AER is less than the first predetermined value.

3. The method of claim 2, wherein, while in the first operational mode, an energy storage device of the vehicle is recharged to increase the AER of the vehicle.

4. The method of claim 2, further comprising:
- maintaining the vehicle in the first operational mode if the AER is determined to be at or less than the second predetermined value.

5. The method of claim 2, wherein the determining whether the AER of the vehicle is at or less than the first predetermined value occurs while in the second operational mode.

6. The method of claim 5, further comprising:
- maintaining the vehicle in the second operational mode if the AER is determined to be greater than the first predetermined value.

7. The method of claim 2, further comprising:
- receiving a request to activate the first operational mode;
- wherein the first operational mode is activated in response to receiving the request.

8. The method of claim 2, further comprising:
- receiving a request to activate the first operation mode;
- wherein the first operational mode is activated in response to receiving the request after the first indication is provided.

9. The method of claim 2, further comprising:
- providing a second indication to the user of the vehicle that the AER is at or less than a third predetermined value that is less than the first predetermined value.

10. The method of claim 9, further comprising:
- activating a third mode for reducing performance of the vehicle relative to the second operational mode if the AER is at or less than the third predetermined value.

11. The method of claim 2, wherein the first predetermined value is a same value as the second predetermined value.

12. The method of claim 2, wherein the first predetermined value is a different value from the second predetermined value.

13. The method of claim 2, wherein an engine of the vehicle is prevented from powering the vehicle in the second operational mode.

14. The method of claim 2, wherein an engine of the vehicle is only allowed to power the vehicle in the first operational mode.

15. The method of claim 2, wherein activating the first operational mode comprises activating an engine of the vehicle to power the vehicle while in the first operational mode.

16. A method of controlling operational modes of a hybrid electric vehicle, the method comprising:
- receiving a request to activate a first operational mode of the vehicle via an actuator;
- determining, in response to receiving the request, whether an all-electric range (AER) of the vehicle is less than a first predetermined value;
- activating the first operational mode if the AER is less than the first predetermined value and preventing activation of the first operational mode if the AER is not less than the first predetermined value;
- determining, while in the first operational mode, if an energy storage device of the vehicle has been recharged such that the AER is above a second predetermined value;
- maintaining the vehicle in the first operational mode if the energy storage device has not been recharged such that the AER is above the second predetermined value; and
- activating a second operational mode if the energy storage device has been recharged such that the AER is above the second predetermined value.

17. The method of claim 16, wherein the request is received while operating in the second operational mode.

* * * * *